United States Patent
Schmit et al.

(10) Patent No.: US 11,281,470 B2
(45) Date of Patent: Mar. 22, 2022

(54) ARGMAX USE FOR MACHINE LEARNING

(71) Applicant: Advanced Micro Devices, Inc., Santa Clara, CA (US)

(72) Inventors: Michael L. Schmit, Santa Clara, CA (US); Lakshmi Kumar, Santa Clara, CA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 16/721,833

(22) Filed: Dec. 19, 2019

(65) Prior Publication Data

US 2021/0191732 A1    Jun. 24, 2021

(51) Int. Cl.
| | | |
|---|---|---|
| *G06F 9/30* | (2018.01) | |
| *G06F 9/38* | (2018.01) | |
| *G06N 20/00* | (2019.01) | |
| *G06F 7/499* | (2006.01) | |
| *G06F 7/483* | (2006.01) | |

(52) U.S. Cl.
 CPC ............ *G06F 9/3887* (2013.01); *G06F 7/483* (2013.01); *G06F 7/49915* (2013.01); *G06F 9/30189* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,844,352 | B2* | 11/2010 | Vouzis | G06F 9/30036 700/44 |
| 8,417,758 | B1* | 4/2013 | Rao | G06F 17/16 708/522 |
| 2005/0053012 | A1* | 3/2005 | Moyer | G06F 9/30109 370/254 |
| 2007/0132967 | A1* | 6/2007 | Damera-Venkata | G03B 21/005 353/121 |
| 2017/0053656 | A1* | 2/2017 | Moriya | G10L 19/038 |
| 2020/0249918 | A1* | 8/2020 | Svyatkovskiy | G06F 8/42 |
| 2020/0364253 | A1* | 11/2020 | Mugan | G06F 16/334 |

OTHER PUBLICATIONS

Schuiki et al.; NTX: An Energy-efficient Streaming Accelerator for Floating-point Generalized Reduction Workloads in 22 nm FD-SOI; Mar. 2019; EDAA 2019.*
Bharati et al.; Implementation of Machine Learning Applications on a Fixed-Point DSP. 2015; IEEE.*

* cited by examiner

*Primary Examiner* — Corey S Faherty
(74) *Attorney, Agent, or Firm* — Volpe Koenig

(57) ABSTRACT

A processing device is provided which comprises memory and a processor. The processor is configured to receive an array of floating point numbers each having a plurality of bits used to represent a probability value. For each floating point number, the processor is configured to replace values in a portion of the bits used to represent the probability value with index values to represent an index corresponding to a location of a corresponding floating point number in the memory. The processor is also configured to process the floating point numbers using SIMD instructions to execute one of an argmax operation and an argmin operation.

20 Claims, 7 Drawing Sheets

ARGMAX USE FOR MACHINE LEARNING

BACKGROUND

Machine learning is widely used in a variety of technologies, such as image classification. For example, convolutional neural networks or models (e.g., AlexNet, Inception, VGG, and ResNet) are used for classifying an image into one of a plurality of predetermined classes. The result of these machine learning models is an array of many (e.g., 1000) different floating point numbers, each having a value (e.g., between 0 and 1.0) which represents the probability of a particular class for the analyzed image, the sum of the values being 1.0 (or 100%).

The maximum function and the minimum function are used to find the maximum or minimum values, respectively, in an array of values. The arguments of the maximum (i.e., argmax) operation and the arguments of the minimum (i.e., argmin) operation find the index of the element that contains the maximum and minimum, respectively.

BRIEF DESCRIPTION OF THE DRAWINGS

A more detailed understanding can be had from the following description, given by way of example in conjunction with the accompanying drawings wherein.

DETAILED DESCRIPTION

Figure 1:
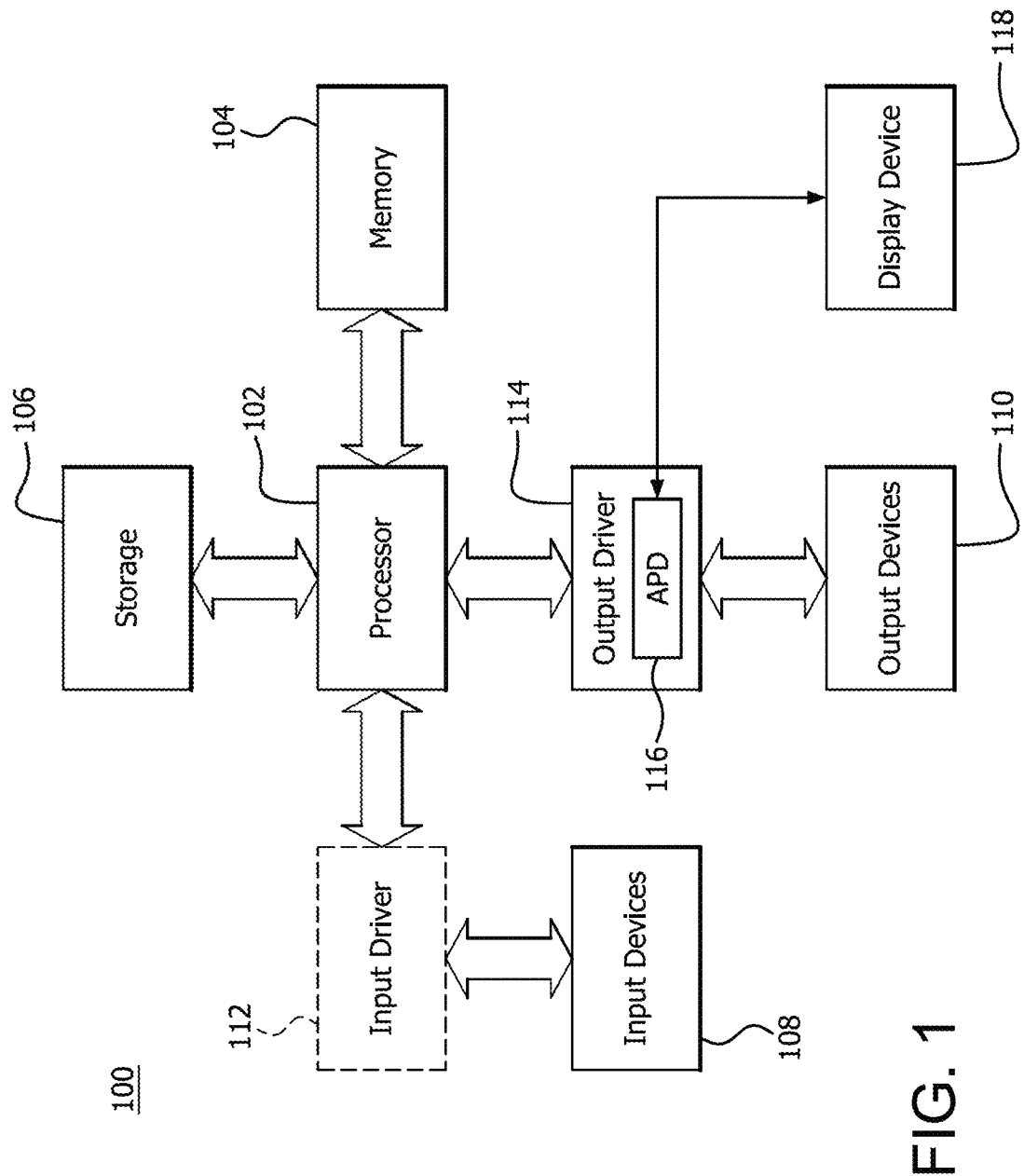
FIG. 1 is a block diagram of an example device in which one or more features of the disclosure can be implemented.

Both the argmax operation and the argmin operation are useful for searching through an array of numbers during execution of various machine learning networks. In addition, both the argmax operation and the argmin operation are useful for a variety of use cases. For simplified explanation, however, features of the disclosure are described herein with reference to using the argmax operation in an image classification use case to determine the highest value (i.e., highest probability) of an array of floating point numbers (each represented by a number of bits) or the top highest group of floating point number values (e.g., 5 highest probabilities) and their index values to classify an image. In addition, features of the disclosure can be implemented in software (e.g., CPU and GPU shaders), in hardware (e.g., accelerated processing devices and a combination of software and hardware.

Due to the large amount (e.g., 1000) of floating point numbers resulting from the machine learning models, the search process to find the highest (i.e., highest probability) is time consuming and not cost efficient. In cases where the search process includes determining a group of the highest values, the search process is even more burdensome. In addition, dedicated hardware (e.g., accelerated processing device, such as a GPU) implementations of the machine learning models typically end their computation at the step before the argmax operation because the argmax operation does not accelerate well and the floating point numbers are sent back to the CPU, which is relative fast at searching (e.g., serial processing) through the floating point numbers to determine the highest value or the highest group of values. Further, additional computations are needed to keep track of which of the floating point numbers has the maximum value while searching through the floating point numbers.

Some complex machine learning models (e.g., object detection models, image segmentation models) include a large number of classes for each pixel in an image. Accordingly, executing the argmax operation results in searching through a very high number of values. For example, executing an argmax operation for a 1000×1000 pixel image, in which each pixel includes 1000 classes, includes searching through 1 billion values.

Single-instruction-multiple-data ("SIMD") instructions (e.g., streaming SIMD extension (SSE) instructions) execute the same instruction, with different data, in parallel with each other. While SIMD instructions can facilitate accelerating the argmax operation by processing multiple floating point values in parallel, the SIMD instructions cannot track the index of each floating point value (e.g., keep track of the highest value) because multiple floating point values are being processed at the same time. Although additional instructions can be used to track the index of each floating point value, these additional instructions negate the advantages initially afforded by using the SIMD instructions to accelerate execution of the argmax operation.

The present application discloses apparatuses and methods for efficiently executing an argmax operation. As described in more detail below with regard to FIGS. 4-6, the argmax is executed by utilizing a number of the bits (for a floating point number) which are determined to be superfluous for accurately representing the probability values between 0 to 100% (i.e., between 0 and 1.0). Some of the bits which are used to represent each floating point value (e.g., in a single-precision 32-bit floating point format FP32, in a half-precision 16-bit floating point format (FP16) or in other precision formats) are ignored. For example, low bits of the floating point values are discarded and the index value is inserted into the discarded bits, facilitating execution of the argmax operation in accordance with a SIMD paradigm in software on a CPU or in hardware (e.g., an accelerated processor, such as a GPU), which increases throughput and reduces the time and power consumption used to execute the argmax operation.

A processing device is provided which comprises memory and a processor. The processor is configured to receive an array of floating point numbers each having a plurality of bits used to represent a probability value. For each floating point number, the processor is configured to replace values in a portion of the bits used to represent the probability value with index values to represent an index corresponding to a location of a corresponding floating point number in the memory. The processor is also configured to process the floating point numbers using SIMD instructions to execute one of an argmax operation and an argmin operation.

A machine learning processing method is provided which comprises receiving an array of floating point numbers each having a plurality of bits used to represent a probability value. The method also comprises, for each floating point number, replacing values, in a portion of the bits used to represent the probability value, with index values to represent an index corresponding to a location of a corresponding floating point number in memory. The method further comprises processing the floating point numbers using SIMD instructions to execute one of an argmax operation and an argmin operation.

A non-transitory computer readable medium is provided which includes instructions for causing a computer to execute a method of message-based communication that improves memory utilization comprising receiving an array of floating point numbers each having a plurality of bits used to represent a probability value. The instructions further comprise for each floating point number, replacing values, in a portion of the bits used to represent the probability value, with index values to represent an index corresponding to a location of a corresponding floating point number in memory and processing the floating point numbers using SIMD instructions to execute one of an argmax operation and an argmin operation.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a SIMD paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
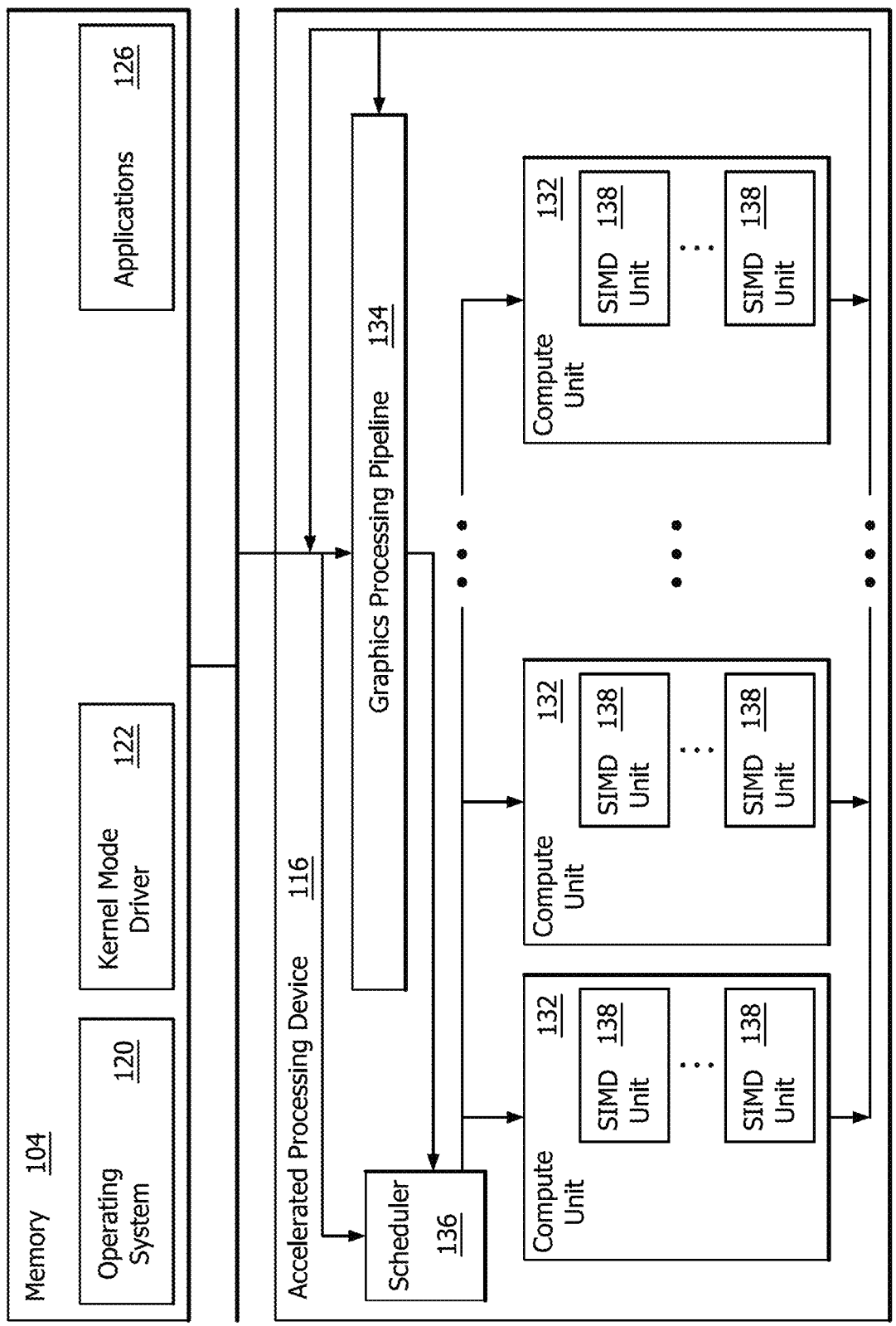
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

While SIMD instructions can be used to determine the values of multiple floating point numbers in parallel, SIMD instructions cannot track the index of each floating point value (e.g., keep track of the highest value) resulting from the machine learning models because the multiple floating point values are being processed at the same time. The following is an example pseudo code used to execute an argmax operation for 1000 floating point numbers using a 4-wide 32-bit with 128-bit wide SIMD:

load 4 elements into xmm1 register
for n=1 to 249
load 4 elements from array[4*n] into xmm2 register
xmm1=maxps (xmm1, xmm2)←F does 4 parallel max operations
next n
get the horizontal max of the 4 results in xmm1

Figure 3:
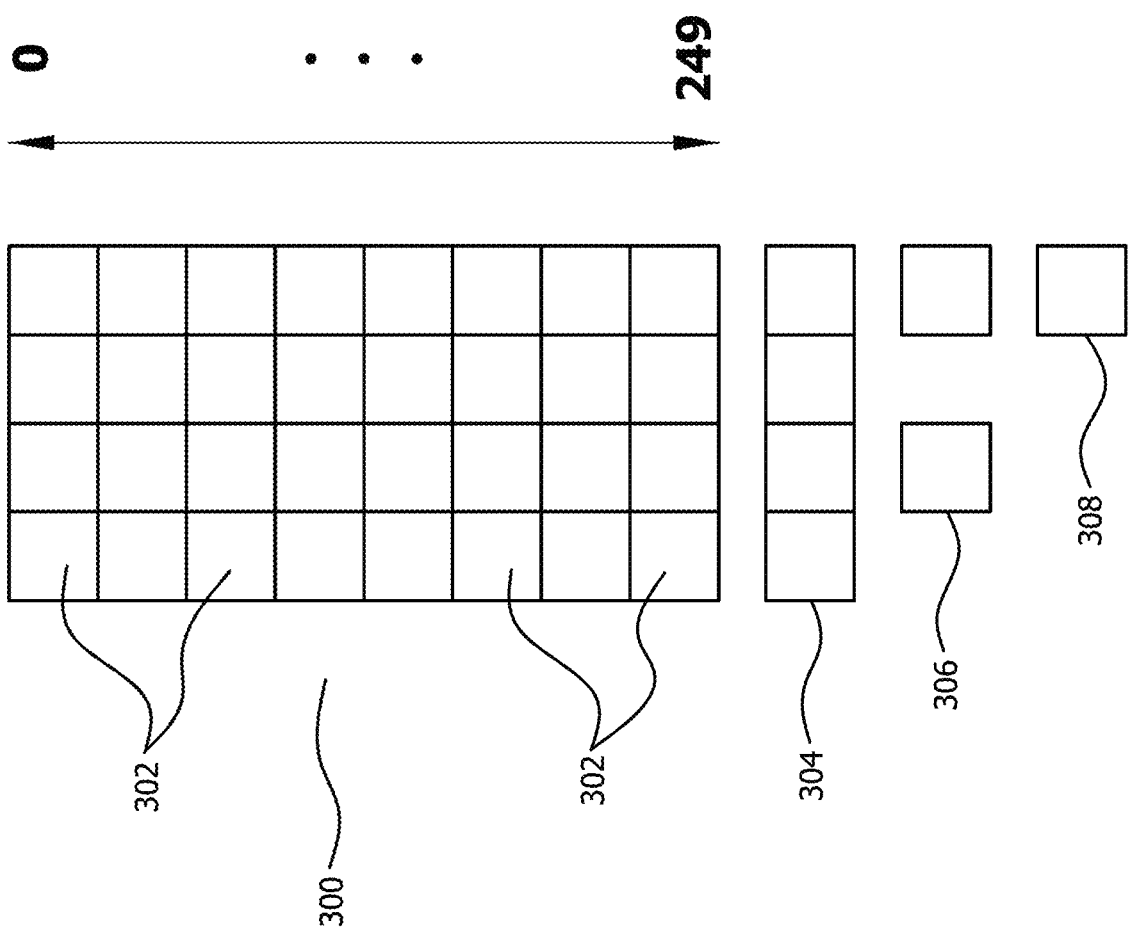
FIG. 3 is an illustration of an example array of floating point numbers and execution of the array according to a single-instruction-multiple-data paradigm.

FIG. 3 is a graphical representation of processing an example memory array 300 of floating point numbers 302 using SIMD instructions. The example array 300 shown in FIG. 3 is a 4×250 array representing 1000 floating point numbers and is processed using the example SIMD pseudo code above. The indices are pre-loaded into the low bits of the floating point numbers 302. The for-loop in the example pseudo code above determines values of four of the floating point numbers 302 in parallel, which reduces to four horizontal values 304 shown in FIG. 3. The maximum value of the first two horizontal values 304 (i.e., horizontal max) and then the second two horizontal values 304 are determined, which reduces to the two horizontal values 306 shown at FIG. 3. The maximum value of the two horizontal values 306 is determined, reducing to the one value 308, which includes the maximum value and a single index for four floating point numbers 302. Accordingly, the pseudo code above cannot keep track of four max values and four index positions without additional instructions because the four floating point numbers are being processed at the same time.

The present application provides apparatuses and methods for efficiently executing an argmax operation by utilizing a number of the bits for a floating point number to represent the index values for the floating point number as the floating point numbers are processed using the SIMD instructions. These bits can used to represent the index values a floating point number because the total number of bits represent each floating point number are superfluous for accurately representing the probability values between 0 to 100% (i.e., between 0 and 1.0). The bits are superfluous due to assumptions made from numerical properties of the probability values of the floating point numbers. For example, each floating point value is between 0.0 and 1.0 and floating point numbers add up to 1.0. Based on these numerical properties, assumptions can be made, such as the floating point numbers cannot have two equal values except for when two values are each 0.5 and the remaining values are 0.0. The floating point numbers also cannot have two values greater than 0.5, three values greater than 0.33, etc. The floating point numbers also can include three equal values of 0.33 or less, four equal values of 0.33 or less, etc.

Typical use cases include floating point values having a single maximum above a minimum threshold above 50%, such as 70% or even higher, to accurately classify an image. The minimum threshold value depends on a number of different factors, such as the usefulness of the threshold value to classify an image for a particular use case (e.g., medical image analysis, pedestrian detection systems in self-driving cars, security and other use cases). For a minimum threshold of 70%, the second highest probability of these floating point values is 30% or less. Based on the assumptions above, a small number of mantissa bits of each floating point number can be used to provide a probability values sufficient for accurately classifying an image. For example, quantizing the mantissa to even 4 bits provides a sufficient numerical granularity to classify the image. Quantizing the mantissa with 8 bits is wasteful, in lieu of the assumptions described above, because 8 bits provides a superfluous granularity of more than 0.5%. While the likelihood of getting equal values increases as the minimum threshold value decreases, the usefulness of the lower probability values decreases. Accordingly, many of the bits representing probabilities are wasted bits in terms of their usefulness for efficiently classifying an image.

Figure 4:
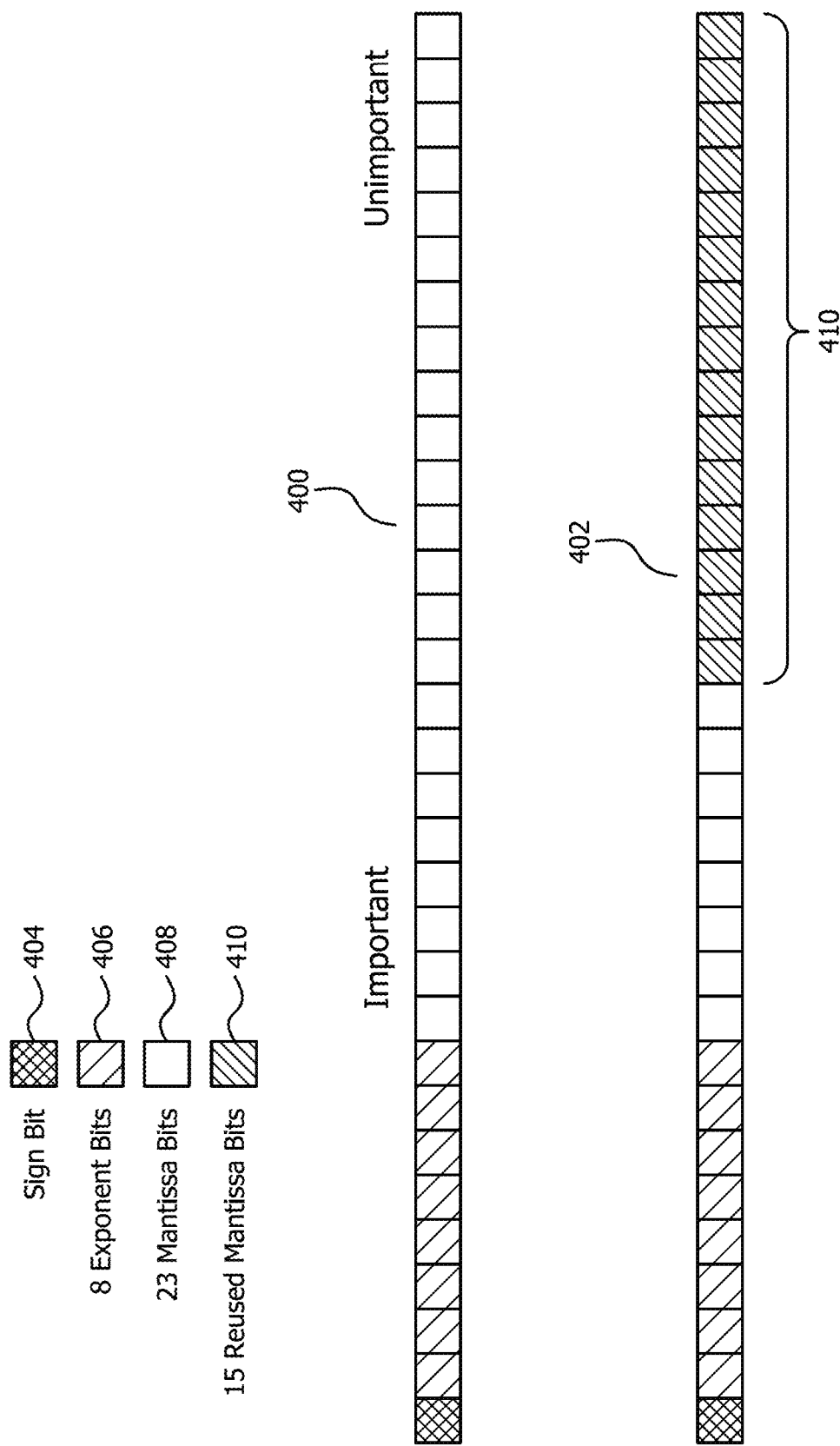
FIG. 4 is an illustration of an example transformation of bits of a 32-bit floating point number according to features of the present disclosure.
Figure 5:
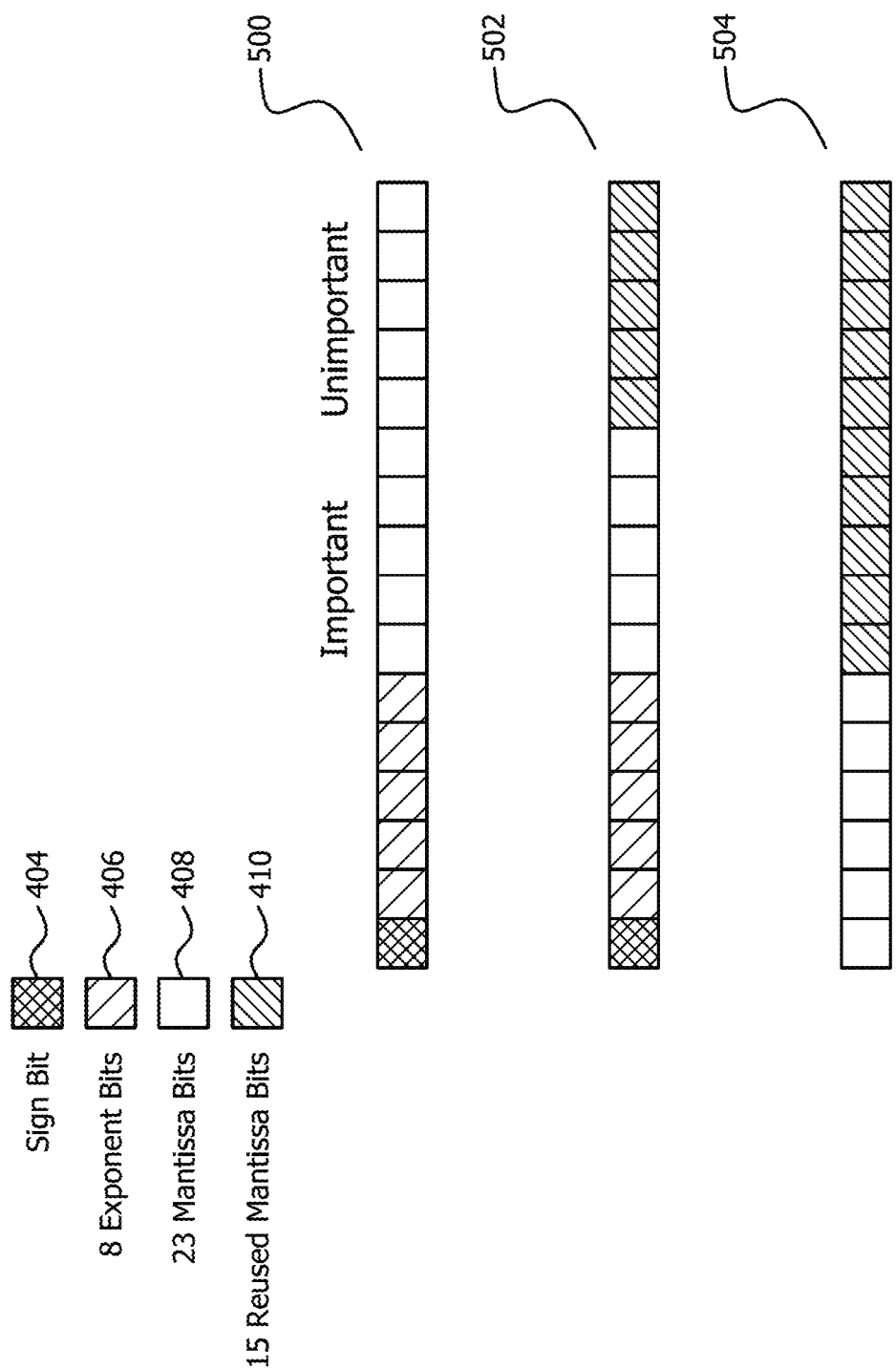
FIG. 5 is an illustration of an example of transforming bits of a 16-bit representation of floating point number according to features of the present disclosure.
Figure 6:
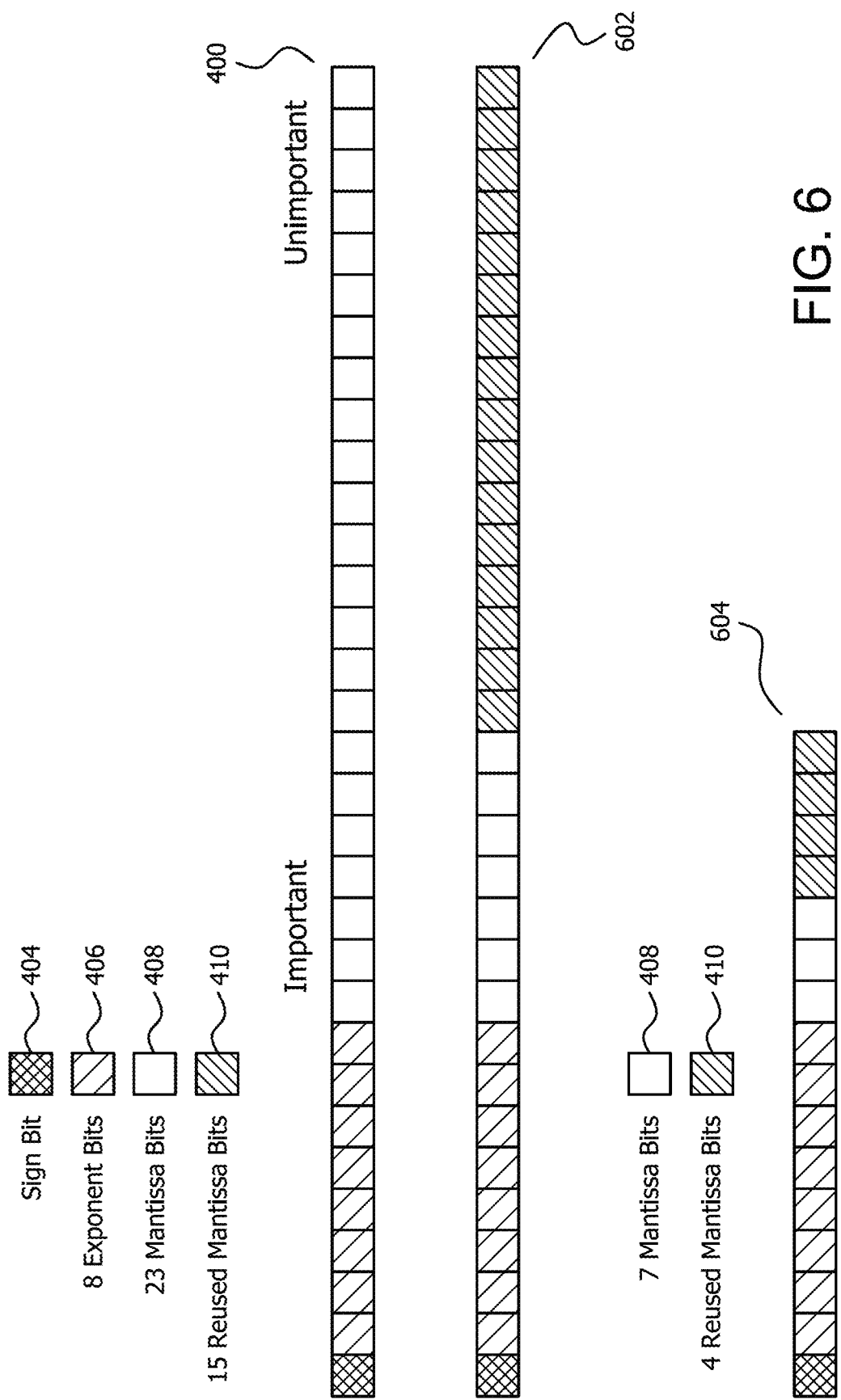
FIG. 6 is an illustration of an example of transforming bits of a 16-bit bfloat representation of the floating point number according to features of the present disclosure.

The floating point numbers can be represented using different formats, such as for example, a single-precision 32-bit floating point format, a half-precision 16-bit floating point format, and a 16-bit bfloat format. FIGS. 4-6 illustrate example transformations of bits of floating point numbers represented in different bit formats. The formats shown in FIGS. 4-6 are merely examples of formats which can be used to implement features of the present disclosure. Other formats of different precisions can be used.

FIG. 4 is an illustration of an example of transforming bits of a 32-bit representation of floating point number 400 according to features of the present disclosure. The top 32-bit representation of the floating point number 400 shows the bits before transformation. The bottom 32-bit representation shows the transformed floating point number 402. As shown in FIG. 4, both the pre-transformed floating point number 400 and the transformed floating point number 402 include 32 bits, including a sign bit 404, 8 exponent bits 406 and 23 mantissa bits 408. As shown in FIG. 4, the transformed floating point number 402 includes 15 reused mantissa bits 410. For example, 15 low order (i.e., unimportant) mantissa bits of the floating point number 400 are set to zero and then reused to store integer index values in the transformed floating point number 402 as the floating point value is processed using the SIMD operations. The remaining 8 high order (important) mantissa bits are used to represent the probability value.

FIG. 5 is an illustration of an example of transforming bits of a 16-bit representation of floating point number 500 according to features of the present disclosure. The top 16-bit representation of the floating point number 500 shows the bits before transformation. The 16-bit representation of the first transformed floating point number 502 includes 5 reused mantissa bits for the integer index value, which is sufficient for 32 indices in some models (e.g., TinyYolo). The 16-bit representation of the second transformed floating point number 504 includes transforming floating point number 500 to include 16 mantissa bits, 10 of which are used for the integer index value.

As shown in FIG. 5, the pre-transformed floating point number 500 and the transformed floating point number 502 include 16 bits, including a sign bit 404, 5 exponent bits 406 and 10 mantissa bits 408. As shown in FIG. 5, the transformed floating point number 504 includes 15 reused mantissa bits 410. For example, 5 low order (i.e., unimportant) mantissa bits of the floating point number 500 are set to zero and then reused to store integer index values in the transformed floating point number 502 as the floating point value is processed using the SIMD operations. The remaining 5 high order (important) mantissa bits are used to represent the probability value.

In the 16-bit representation of the second transformed floating point number 504, the sign bit is eliminated because each of the numbers is a positive number. The exponents can be normalized to eliminate the exponent bits. keep 6 mantissa bits. A conversion is used because of the assumed high bit in the mantissa. The floating point number 504 is transformed to include 16 mantissa bits, 10 of which are used for the integer index value (e.g., to handle 1024 indices) and the remaining 5 high order mantissa bits are used to represent the probability value.

FIG. 6 is an illustration of an example of transforming bits of a 16-bit bfloat representation of the floating point number 400 shown in FIG. 4 according to features of the present disclosure. The 16-bit bfloat format is the same as 32-bit format shown in FIG. 4, except with the least significant 16 bits removed.

For example, as shown in the first transformed floating point number 602 in FIG. 6, the least significant 16 bits are removed and are replaced with a larger 16 bit index. The index is extendible up to a total of 32 bits. Alternatively, as shown in the second transformed floating point number 604 in FIG. 6, the data remains at 16 total bits and the least significant mantissa bits are replaced with a smaller index of 4 bits.

After the floating point numbers are transformed to include the probability values in the high order bits and the index values in the low order bits, a conventional maximum or minimum comparison results with both the maximum (or minimum) values and the index values.

When FP32 or FP16 format is preserved, a FP32 or FP16 maximum or minimum operation is used. Bfloat16 can be treated as FP32.

When the data is converted to remove the sign and exponent, then an unsigned integer operation is used.

If dedicated hardware is used, the sort key and the index are merged into one string of bits. To perform the maximum or minimum only on the sort key and order does not matter.

Figure 7:
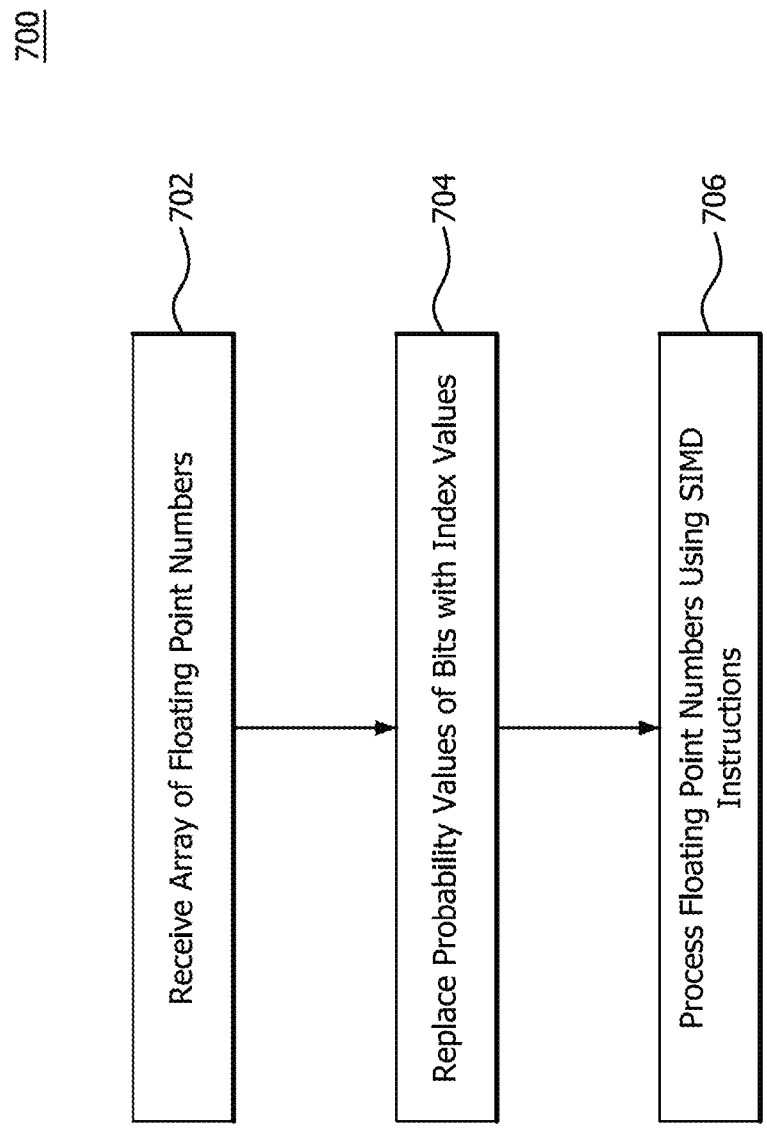
FIG. 7 is a flow diagram illustrating an example method of processing an array of floating point numbers using SIMD instructions.

FIG. 7 is a flow diagram illustrating an example method of processing an array of floating point numbers using SIMD instructions.

As shown at block 702 in FIG. 7, the example method includes receiving an array of floating point numbers. Each floating point numbers includes a plurality of bits used to represent a probability value.

As shown at block 704 in FIG. 7, the example method includes replacing values in a portion of the bits used to represent the probability value with index values to represent an index corresponding to a location of a corresponding floating point number in the memory. For example, for each floating point number a portion of the mantissa bits used to represent the probability value is zeroed and reused to store index values of the floating point number.

As shown at block 706 in FIG. 7, the example method includes processing the floating point numbers using SIMD instructions to execute one of an argmax operation and an argmin operation. For example, after the floating point numbers are transformed to include the probability values in the high order bits and the index values in the low order bits, a conventional maximum or minimum comparison results with both the maximum (or minimum) values and the index values.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132 and the SIMD units 138 can be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
    memory; and
    a processor configured to:
        receive an array of floating point numbers each having a plurality of bits used to represent a probability value;
        for each floating point number, replace values in a portion of the bits used to represent the probability value with index values to represent an index corresponding to a location of a corresponding floating point number in the memory; and
        process the floating point numbers using SIMD instructions to execute one of an argmax operation and an argmin operation.

2. The processing device of claim 1, wherein the processor is configured to determine one of the highest probability value of the floating point numbers and a group of the highest probability values of the floating point numbers.

3. The processing device of claim 1, wherein the SIMD instructions are SSE instructions executed on a CPU.

4. The processing device of claim 1, wherein the SIMD instructions are executed on an accelerated processor.

5. The processing device of claim 1, wherein the processor is configured to replace values in the portion of the bits used to represent the probability value with index values by setting the values in the portion of the bits to zero and inserting the index values in the portion of the bits.

6. The processing device of claim 1, wherein the portion of the bits comprises the least important mantissa bits.

7. The processing device of claim 1, wherein the processor is configured to eliminate the sign bit of the floating point numbers.

8. The processing device of claim 1, wherein the processor is configured to normalize exponents of the floating point numbers and eliminate the exponent bits.

9. A method of processing floating point arrays comprising;
    receiving an array of floating point numbers each having a plurality of bits used to represent a probability value;
    for each floating point number, replacing values, in a portion of the bits used to represent the probability value, with index values to represent an index corresponding to a location of a corresponding floating point number in memory; and
    processing the floating point numbers using SIMD instructions to execute one of an argmax operation and an argmin operation.

10. The method of claim 9, further comprising determining one of the highest probability value of the floating point numbers and a group of the highest probability values of the floating point numbers.

11. The method of claim 9, wherein the SIMD instructions are SSE instructions executed on a CPU.

12. The method of claim 9, wherein the SIMD instructions are executed on an accelerated processor.

13. The method of claim 9, further comprising replacing values in the portion of the bits used to represent the probability value with index values by setting the values in the portion of the bits to zero and inserting the index values in the portion of the bits.

14. The method of claim 9, wherein the portion of the bits comprises the least important mantissa bits.

15. The method of claim 9, further comprising eliminating the sign bit of the floating point numbers.

16. The method of claim 9, further comprising normalizing exponents of the floating point numbers and eliminate the exponent bits.

17. A non-transitory computer readable medium comprising instructions for causing a computer to execute a method of processing floating point arrays, the instructions comprising:
    receiving an array of floating point numbers each having a plurality of bits used to represent a probability value;
    for each floating point number, replacing values, in a portion of the bits used to represent the probability value, with index values to represent an index corresponding to a location of a corresponding floating point number in memory; and
    processing the floating point numbers using SIMD instructions to execute one of an argmax operation and an argmin operation.

18. The computer readable medium of claim 17, wherein the SIMD instructions are SSE instructions executed on a CPU.

19. The computer readable medium of claim 17, wherein the SIMD instructions are executed on an accelerated processor.

20. The computer readable medium of claim 17, wherein the instructions further cause the computer to replace values in the portion of the bits used to represent the probability value with index values by setting the values in the portion of the bits to zero and inserting the index values in the portion of the bits.

* * * * *